United States Patent [19]

Bowen et al.

[11] Patent Number: 4,945,019

[45] Date of Patent: Jul. 31, 1990

[54] FRICTION WELDED BATTERY COMPONENT

[75] Inventors: Gerald K. Bowen, Cedarburg; Jeffrey P. Zagrodnik, Hales Corner, both of Wis.

[73] Assignee: Globe-Union Inc., Milwaukee, Wis.

[21] Appl. No.: 247,035

[22] Filed: Sep. 20, 1988

[51] Int. Cl.$^5$ ............................................. H01M 2/38
[52] U.S. Cl. ........................................ 429/72; 429/36; 429/39; 429/185; 429/210
[58] Field of Search .................. 429/72, 171, 174, 185, 429/210, 34, 36, 38, 39

[56] References Cited

U.S. PATENT DOCUMENTS

| | | | |
|---|---|---|---|
| 3,573,104 | 3/1971 | Snyder, Jr. et al. | 429/39 X |
| 4,074,020 | 2/1978 | Regnaut | 429/34 |
| 4,164,068 | 8/1979 | Shropshire et al. | 29/623.1 |
| 4,461,817 | 7/1984 | Itoh et al. | 429/72 X |
| 4,696,870 | 9/1987 | Sasaki et al. | 429/34 |
| 4,732,823 | 3/1988 | Ito et al. | 429/72 |
| 4,735,630 | 4/1988 | Planchat | 429/70 |

*Primary Examiner*—Anthony Skapars
*Attorney, Agent, or Firm*—Foley & Lardner

[57] ABSTRACT

A battery component for use in a flow battery is provided with a weld rib pattern on a planar surface thereof. The weld rib pattern includes respective weld ribs defining a sealable flow region therebetween and further includes respective flash traps disposed adjacent each of the weld ribs opposite the sealable flow region. The battery components are stacked one on top of the other and friction welded together to form a flow path within the sealable flow path region. During the welding process, the weld rib material is melted and deposited in the adjacent flash traps.

15 Claims, 4 Drawing Sheets

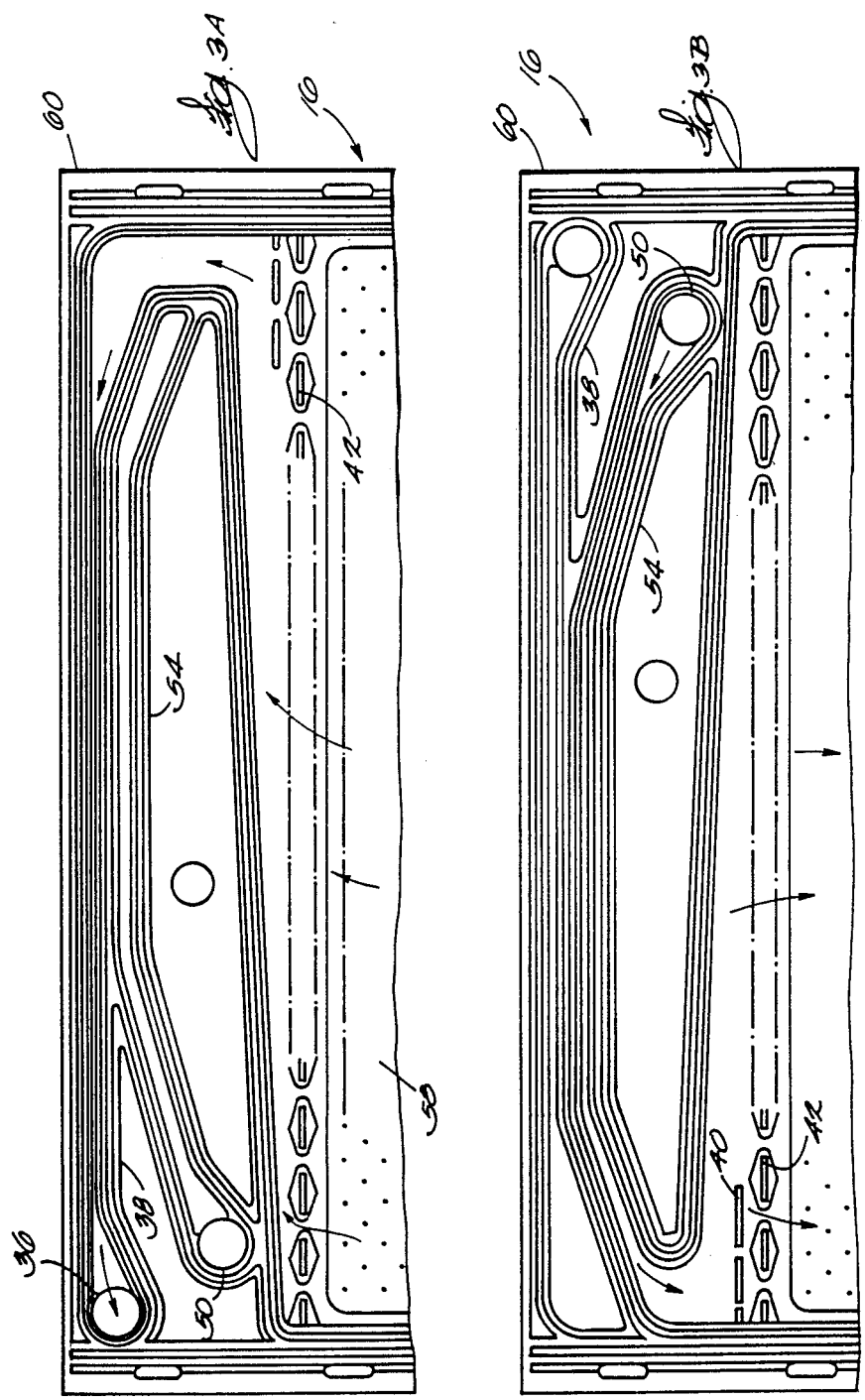

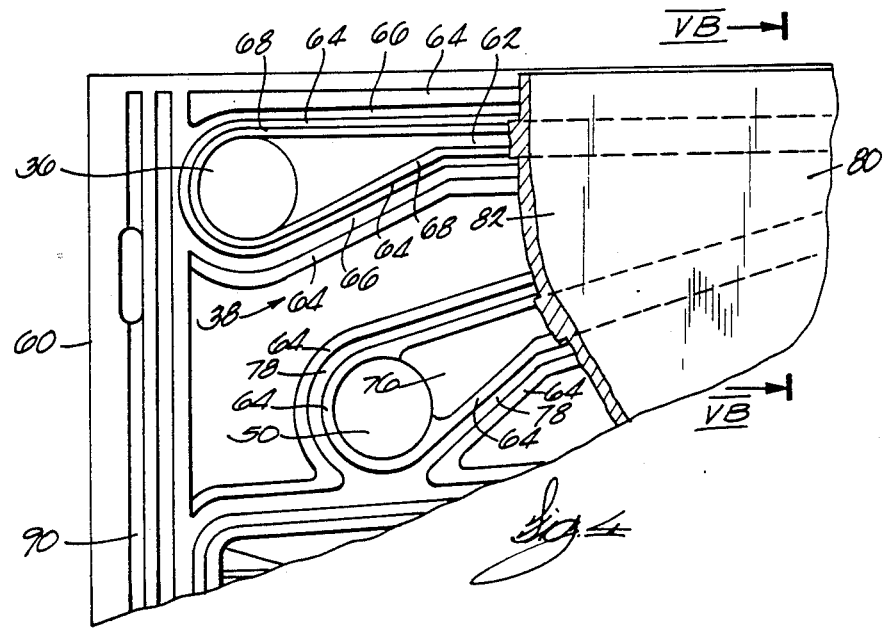
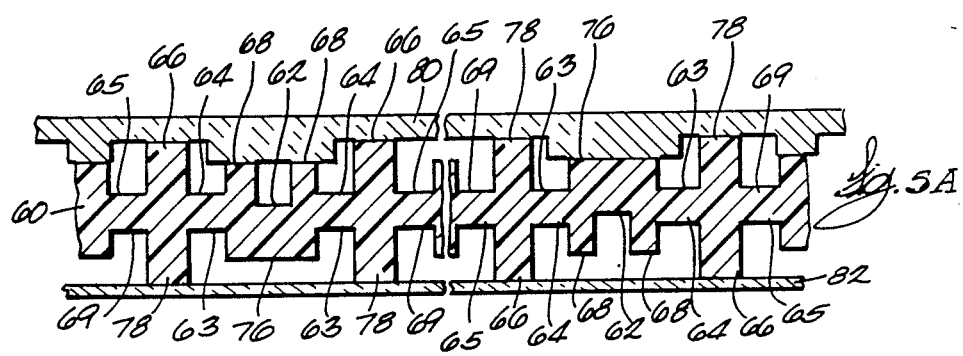
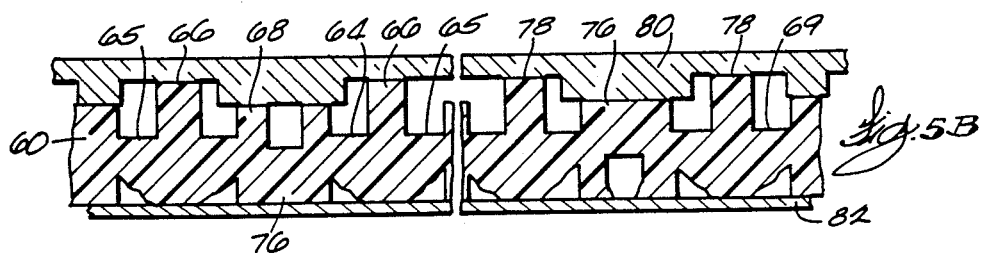

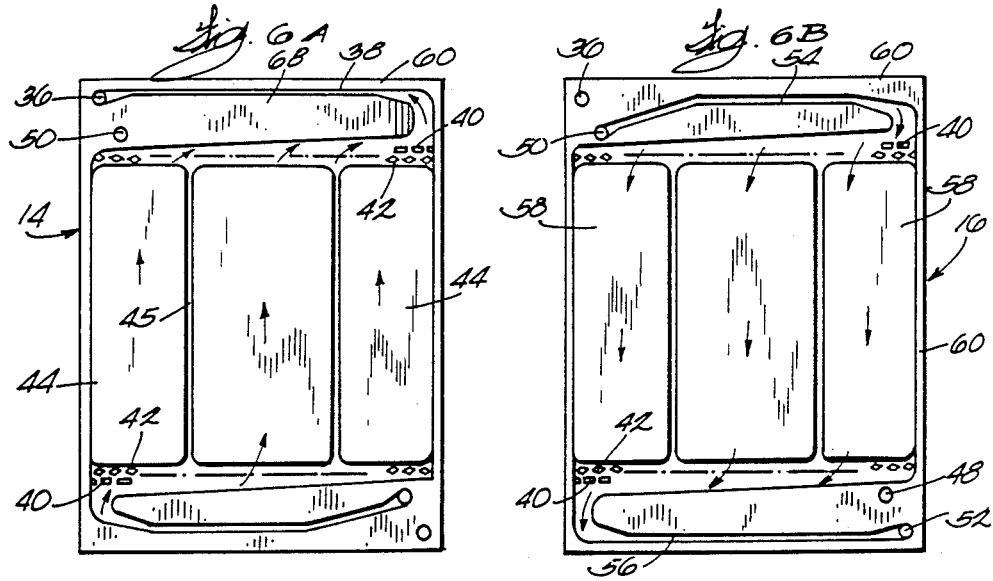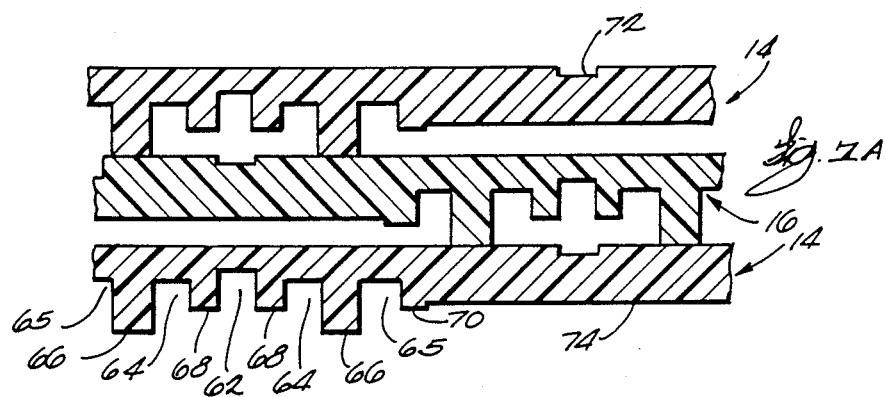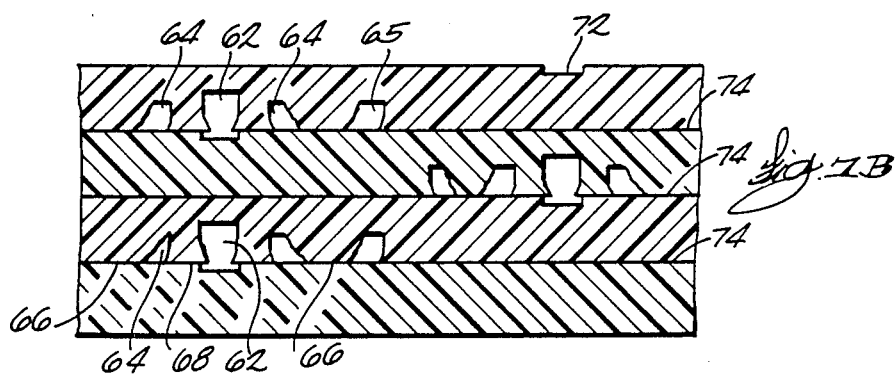

FRICTION WELDED BATTERY COMPONENT

TECHNICAL FILED

The present invention relates generally to a method and apparatus for friction welding flow battery components together to form a battery stack, and more particularly, to battery components having a weld rib pattern configured to produce a strong, leak-proof fusion seal about a flow path.

BACKGROUND OF THE INVENTION

Bipolar electrochemical flow battery systems are generally well known. See, for example, U.S. Ser. No. 189,363 entitled "Terminal Electrode", filed May 2, 1988, by J. Zagrodnik and G. Bowen (attorney docket 91872), the disclosure of which is hereby incorporated by reference.

A flow battery typically comprises a series of voltaic cells, a pump for pumping electrolyte through the cells, an electrolyte reservoir, a cooling element, and external load-attachment studs in electrical communication with terminal electrodes located at each end of the battery.

The cells are made up of a series of alternating electrodes and separators such that each cell comprises an electrode upon which the anodic reaction and the cathodic reaction takes place on opposite sides. An ion-permeable separator separates the anodic from the cathodic half-cell. Anolyte is pumped through each anodic half-cell and catholyte is pumped through each cathodic half-cell. There is no hydraulic communication between adjacent half-cells; an anode half-cell is disposed between each cathode half-cell and vice versa.

Maximizing power output, and hence minimizing parasytic power losses, from bipolar flow batteries is an important design objective. Power losses result when catholyte leaks into an anolyte half-cell or when anolyte leaks into a catholyte half-cell due to the reduction in electrochemical potential. Similarly, electrolyte leakage to the external surface of a battery results in power loss, in addition to the associated corrosion and handling problems. Thus, it is desirable to provide strong, leak-proof seals between separators and electrodes to properly contain electrolyte.

Shropshire et al., U.S. Pat. No. 4,164,068 (Aug. 14, 1979), discloses, at column 5, lines 24-62, bipolar carbon-plastic electrode structures and other cell elements stacked together to form an electrochemical cell-functional arrangement. Adjacent frames are arranged so that a projection or one element contacts the frame surface of the next element in the stack. After the elements are stacked, they are sealed to one another, for example, by blast welding or ultrasonic welding.

Other attempts have been made to seal battery components together through the use of bolts, adhesives, or solvents. However, adhesives have proven unsatisfactory because of their general incompatibility with polyolefins, a material often used in the construction of separator and electrode frames. Solvent welding reduces design flexibility and increases piece part production cost because both the electrode and separator frame are generally coated with solvent. The use of bolts is undesirable because electrolyte often leaks through the bolt holes and the electrode or separator frames.

SUMMARY OF THE INVENTION

The present invention provides a rib pattern along the periphery of separators and electrodes and along electrolyte inlet and discharge flow paths located on the surface of separator and electrode frames. Upon friction welding adjacent frames together, a strong, leak-proof seal is obtained without the use of bolts, solvents or adhesives. The tooling required to properly support a weld rib pattern during welding is also provided.

BRIEF DESCRIPTION OF THE DRAWING

Exemplary embodiments of the battery components and methods in accordance with the present invention will hereinafter be described in conjunction with the appended drawings wherein like designations denote like elements, and:

FIGS. 3A and 3B are plan views of opposite faces, respectively, of the top end of a typical separator or electrode frame in accordance with an alternate embodiment of the present invention;

FIG. 4 is an enlarged view of a portion of the weld rib pattern of FIG. 3A;

FIG. 5A is a cross-section view of the flow channels shown in FIG. 4, supported by tooling, shown prior to friction welding;

FIG. 5B is a cross-section view of the flow channels shown in FIG. 5A, shown after vibration welding;

FIG. 6A is a plan view of an exemplary embodiment of the face of a electrode in accordance with a preferred embodiment of the present invention;

FIG. 6B is a plan view of the face of an separator in accordance with a preferred embodiment of the present invention;

FIG. 7A shows a cross-section view of a preferred embodiment of an unwelded stack of separators and electrodes;

FIG. 7B is a cross-section view of the battery components shown in FIG. 7A in the welded state.

DETAILED DESCRIPTION OF THE EXEMPLARY EMBODIMENTS

Figure 1:
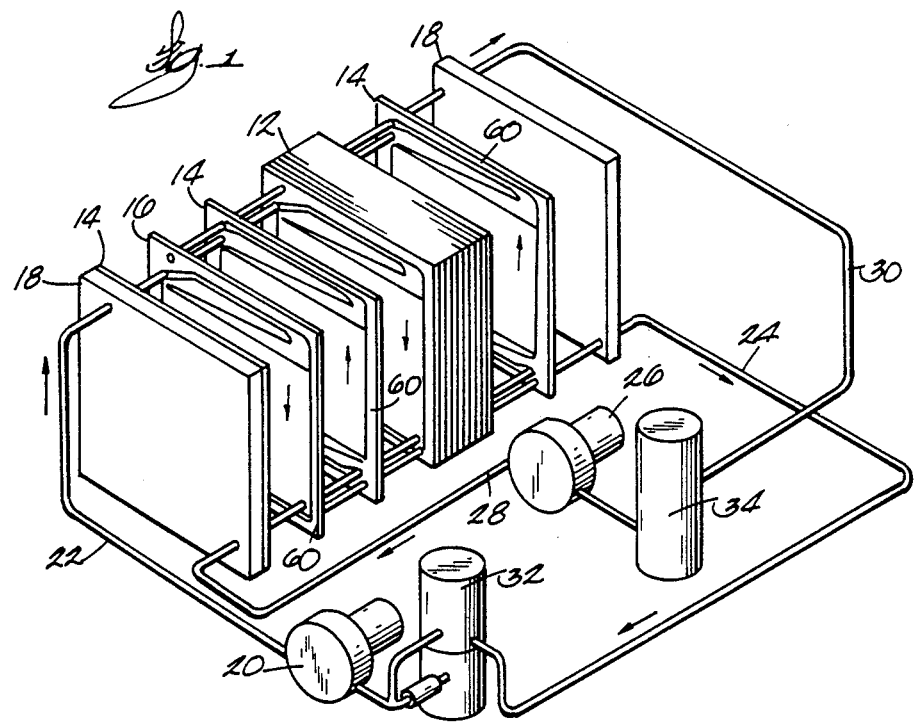
FIG. 1 is a schematic diagram of an exemplary embodiment of a stack of alternately disposed friction welded battery components, cooperating with a typical bipolar flow battery.

Referring to FIG. 1, a bipolar flow battery 10 is shown in accordance with the present invention. Flow battery 10 comprises a series of electrodes 14 and separators 16, friction welded together to form a stack 12 of alternating anodic and cathodic electrochemical cells. Respective end blocks 18 are disposed at each end of battery 10.

Aqueous catholyte is stored in a catholyte reservoir 32. A catholyte pump 20 pumps aqueous catholyte through a common catholyte inlet manifold 22 into each cathodic half-cell. The catholyte flows down the cathodic half-cell, as indicated by the arrows, and back to catholyte reservoir 32 through a catholyte common return manifold 24.

Similarly, aqueous anolyte is stored in an anolyte reservoir 34 and pumped through anolyte inlet manifold 28 by an anolyte pump 26. Anolyte flows through each anodic half-cell, one of which is disposed between each cathodic half-cell, and back to anolyte reservoir 34 through an anolyte return manifold 30.

Each electrode and separator comprises a thin sheet of electrode or separator material surrounded by a polyethylene or polypropylene flow frame 60. The frame material may be reinforced with glass fibers, talc, or other filler. Long, winding electrolyte inlet and outlet channel patterns are incorporated into one or both sides of the separator frame, the electrode frame, or both. The geometry of the channels, in particular their relatively small cross section, contributes to the electrical resistance required to reduce shunt currents which result in cell power losses. A leak-free internal seal must be maintained along these channels and about the common perimeter of adjacent separators and electrodes.

Referring now to FIG. 6A, electrode 14 suitably includes an anolyte inlet orifice 48, an anolyte inlet flow channel pattern 46, and a plurality of flow deflectors 40 and flow distributors 42. Flow distributors 42 may advantageously be diamond-shaped, as shown in FIG. 6A. Deflectors 40 and distributors 42 ensure uniform flow distribution of anolyte across the electrode material 44. Electrode material 44 may be made from polyethylene, polypropylene, or various copolymers thereof, and may contain carbon black to facilitate conductivity. In addition, electrode material 44 may comprise three discrete segments, as shown in FIG. 6A, with one or more frame bridges 45 disposed between segments 44. Electrode 14 further includes an anolyte return flow channel pattern 38, terminating at an anolyte return orifice 36.

Referring now to FIG. 6B, separator 16 suitably includes a catholyte inlet orifice 50; a catholyte inlet flow channel pattern 54; a plurality of flow deflectors 40 and flow distributors 42; ion-permeable separator material 58; a catholyte return flow channel pattern 56; and a catholyte return orifice 52.

In a bipolar flow battery such as the one shown in FIG. 1, each voltaic cell includes an anodic and a cathodic half-cell. As such, each alternately disposed electrode 14 and separator 16 have one face in contact with the anolyte and one face in contact with the catholyte. With reference to FIGS. 1, 6A, and 6B, when a series of electrodes 14 and separators 16 are friction welded together, as discussed below, successive anolyte return orifices 36 come into registration and form a portion of anolyte return manifold 30. In a similar manner, orifices 48, 50 and 52 form a portion of anolyte inlet manifold 28, catholyte inlet manifold 22, and catholyte return manifold 24, respectively.

In a preferred embodiment of the present invention, one electrolyte inlet and one electrolyte return flow channel pattern is provided on one face of each separator and each electrode, as shown in FIGS. 6A and 6B. The opposite faces of the components, which cannot be seen in FIGS. 6A and 6B, have essentially planar surfaces.

Referring now to FIG. 7A, a cross-section of a series of exemplary flow channel weld rib configurations is shown in a pre-welded state. As explained below, only one separator 16 or electrode 14 is generally welded to a stack at a time; the 3-tiered weld rib pattern in FIG. 7A merely illustrates the relative diposition of flow channels in a stack. Each weld rib pattern, or flow channel pattern, suitably includes a channel pattern 62 extending below the surface 74 of frame 60; a first pair of kiss ribs 68; a first pair of flash traps 64; respective weld ribs 66; and a second pair of flash traps 65. An outer, second pair of kiss ribs 70 may also be employed.

Kiss ribs 68, 70 and weld ribs 66 extend above surface 74. Each separator and electrode frame preferably includes a partial channel pattern 72 disposed on the opposite side of the weld rib pattern, spaced apart from the pattern.

With reference to FIGS. 6A, 6B and 7A, note that the flow channel pattern at the top of FIGS. 6A and 6B are staggered by an amount equal to the distance between channel pattern 62 and partial channel pattern 72 shown in FIG. 7A. Partial channel pattern 72 aligns with channel pattern 62 on the opposite side of the adjacent frame during assembly, thereby permitting frame 60 to be of minimal thickness while still providing the desired channel volume. When the sealing means, or weld rib pattern, of a frame is aligned with the mating sealing means of the adjacent frame, the two sealing means are said to be in registration. For example, the frames shown in FIGS. 7A and B, with channel pattern 62 communicating with partial channel pattern 72, are in registration.

Referring now to FIG. 7B, a cross section view of the battery stack of FIG. 7A is shown after friction welding, as explained in further detail below. This or a similar pattern is provided in all areas where a fluid seal is desired, e.g., along the entire length of a flow channel, the manifold orifices, and around the periphery of the electrode and separator frames to provide an external seal which avoids electrolyte loss from the battery stack.

With continued reference to FIGS. 7A and 7B, a strong and leak-proof fusion seal is formed at weld ribs 66 and a leak-proof fusion seal is formed at kiss ribs 68 and 70. During the welding process, a separator is rubbed against an electrode at high frequency, for example, 240 Hz, and low amplitude, for example, +/−0.030 inches. The rubbing causes local heating of the frame material, first at the weld ribs and thereafter at the shorter kiss ribs.

As the frame material at weld ribs 66 and kiss ribs 68 melts, molten material (flash) flows into flash traps 64 and 65 and, to a limited extent, into channel pattern 62, thereby avoiding build-up of flash on surface 74. To ensure adequate containment of the flash, flash traps 64 and 65 are slightly larger, for example, 15 percent, than the volume of weld rib material to be contained. This leads to a potential problem if kiss ribs 68 are not included at the edges of channel pattern 62. Since the flash traps are oversized, a void will remain after welding is completed. If the fusion seals were not provided at the channel borders, i.e., if kiss ribs 68 were coplanar with surface 74, electrolyte might seep into the voids. Although this seepage would probably not have a significant impact on system hydraulics, it could cause a reduction in the electrical resistance of the flow channel due to the increased effective cross-section area thereof.

The problem is avoided by providing short kiss ribs 68 at the edges of channel pattern 62. The ribs should be as small as possible while ensuring the needed leak-proof seal. Since kiss ribs 68 are bordered by channel pattern 62 on one side, the amount of kiss rib flash which enters channel pattern 62 should be kept to a minimum, for example, 4% of channel volume, to avoid significant reduction the effective cross-section area of channel pattern 62.

The sealing requirements of kiss ribs 68 and 70 are less stringent than those at weld rib 66 because kiss ribs need not provide significant mechanical bonding strength. The bond strength, which must be adequate to hold the stack together at normal operating pressures, for example 6 to 12 psig, is provided by weld ribs 66. In addition, a small kiss rib may be provided on the surface of flow deflectors 40 and flow distributors 42 (See FIGS. 6A and 6B), although flash traps are not generally necessary.

Referring now to FIGS. 3A and 3B, an alternate preferred embodiment of separator 16 has both anolyte return flow channel pattern 38 and catholyte inlet flow channel pattern 54 disposed on opposite faces of the top end of, for example frame 60 of separator 16. In contrast to the previous embodiment wherein the backside of a channel weld rib pattern is essentially planar (see FIG. 7A), the alternate preferred embodiment of FIGS. 3A and B provides supporting ribs on the backside of a channel weld rib pattern. That is to say, FIG. 3A illustrates the channel side of anolyte return flow channel pattern 38, and immediately below it, the backside, or the supporting ribs, of catholyte inlet flow channel pattern 54. FIG. 3B depicts the opposite face of the top end of the separator frame of FIG. 3A, illustrating the flow channel side of catholyte inlet channel pattern 54 and the supporting rib side of anolyte return channel pattern 38.

Similarly, the bottom end of separator 16 (not shown in the drawing) includes the flow channel side of anolyte inlet channel pattern 46 and the support ribs of catholyte return flow channel pattern 52 on one face, and the flow channel side of catholyte return flow channel pattern 52 and support rib side of anolyte inlet channel pattern 46 on the opposite face.

In the alternate preferred embodiment, each separator frame includes anolyte and catholyte inlet and return channel patterns, as well as the support rib patterns for each. Thus, both faces of the electrode frames are essentially planar. Alternatively, flow channel patterns 38, 46, 54, and 56 may be disposed on the electrode frame, so that the separator frame is essentially planar.

Referring now to FIG. 4, an enlarged view of the left side of FIG. 3A shows the weld rib and support rib pattern of an exemplary flow frame 60. An adjacent frame 82, a cut-away view of which is shown in FIG. 4, may be a planar electrode frame (if the flow channels are disposed on the separator frame), or frame 82 may be a planar separator frame (if the flow channels are disposed on an electrode). Adjacent frame 82 is friction welded to the weld rib pattern of the underlying frame, as explained below.

Referring to Figure FIGS. 5A and B, a cross section of the flow channels of FIG. 4 comprises a flow channel pattern on the upper and lower surfaces of frame 60. The weld rib configuration comprising each-flow channel pattern suitably includes a channel 62 flanked by: respective kiss ribs 68; respective first flash traps 64; respective weld ribs 66 and respective second flash traps 65. Directly opposite each flow pattern is a support rib pattern comprising a channel back 76 directly opposite channel 62; respective first supporting flash traps 63 directly opposite respective first flash traps 64; support ribs 78 directly opposite bond ribs 66; and respective second supporting flash traps 69 directly opposite respective second flash traps 65.

During the welding process, when adjoint frame 82 is welded to frame 60, support is needed behind every weld. When weld ribs 66 are welded, support ribs 78 provide the needed support. When kiss ribs 68 are welded, tooling 80, which abuts channel back 76, provides the required support. Tooling 80 is an approximate mirror image of its mating rib pattern, i.e., it provides support for the back side of all weld surfaces which are not self-supported by oppositely disposed supporting ribs.

THE WELDING PROCESS

Figure 2:
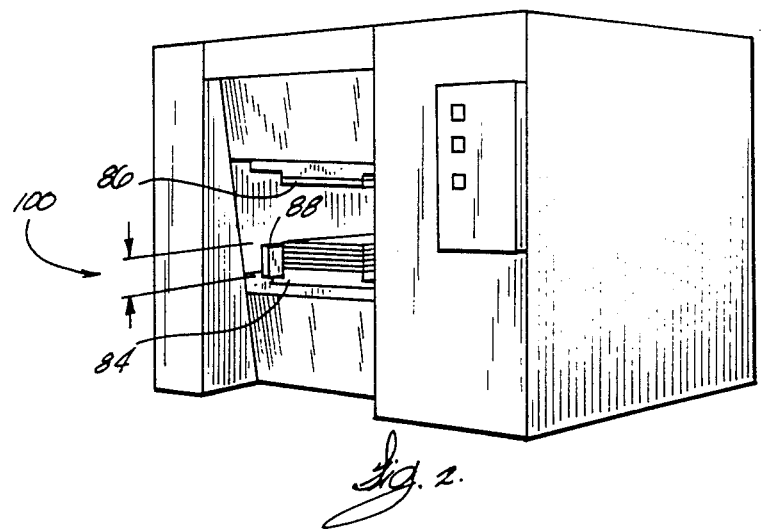
FIG. 2 is a perspective view of an exemplary vibration welding machine used to friction weld successive battery components together.

Referring now to FIGS. 1 and 2, the vibrating machine used to friction weld the components together suitably comprises a Branson sonic vibration welder model 2700 or 2800, made by the Branson Ultrasonics Corporaton of Danbury, Conn.

The welding process involves loading end blocks 18, separators 16, and electrodes 14 into an upper fixture 86 and a lower fixture 84 in a welder 100. Data furnished by Branson regarding bolt sizes and weight requirements for the fixtures used to secure the mating components during welding in large measure dictates the design of the fixtures. Both fixtures preferably include a cavity having the same peripheral dimensions as end block 18, into which end block 18 is inserted. The cavity preferably has sufficient depth, for example approximately 0.500 inches, to securely hold end block 18 during welding.

With continued reference to FIGS. 1 and 2, adjacent components to be welded together are placed into a welding machine 100. The vibration welding process generally involves securing a first battery component in lower fixture 84 and a second battery component in upper fixture 86. The lower fixture then raises up until contact is made between the two components, and an indicator is set to zero. Vibration commences, and the bottom fixture moves upwardly a predetermined distance corresponding to the desired amount of weld rib to be converted into flash. To ensure sufficient bonding strength, an exemplary weld rib depth of approximately 0.035 to 0.037 inches is measured by the indicator.

After a weld cycle is completed, the means by which the component is held in the upper fixture, for example suction, are disengaged and the lower fixture moves downwardly with the newly welded component secured thereto. Another component is then secured to the top fixture and the process is repeated. When the desired number of battery components is welded to the stack on the bottom fixture, an end block is placed in the upper fixture and welded to the end of the stack to complete the battery welding process.

In the preferred embodiment discussed above with reference to FIGS. 6 and 7, each separator and each electrode frame has a weld rib pattern on one face, the opposite face being essentially planar except for the partial channel. The welding process associated with this preferred embodiment begins by loading an end block into a bottom fixture. An insert is then placed in the cavity of the upper fixture to compensate for the fact that the electrodes and separators are typically thinner than the end block, thus allowing the weld rib pattern to protrude from the fixture cavity. An electrode is placed in the upper fixture such that the weld rib pattern faces downward, the essentially planar surface of the electrode being disposed flush with the insert in the cavity in the upper fixture.

The first electrode which is loaded into the upper fixture and friction welded to the end block is called the terminal electrode. The weld rib pattern disposed on the frame of the terminal electrode is essentially the same as that of every other electrode in the battery. The terminal electrode may, in addition, have an internal screen for collecting current.

Upon completion of the weld cycle, the terminal electrode is permanently joined to the end block. Suction, dowels, or any other suitable means used to hold the electrode in the upper fixture are removed, and the lower fixture moves down. A separator is then loaded into the upper fixture. Since the separator and electrode preferably have the same thickness, the upper fixture and the upper fixture insert configuration need not be altered to accommodate the separator. The separator is secured in the upper fixture, weld ribs facing downwardly, in the same manner in which the electrode was secured to the upper fixture. Referring again to FIGS. 6–7B, note that the partial channel on the planar side of each electrode and separator will come into registration with the corresponding flow channel of the mating weld rib pattern.

As successive electrodes and separators are welded to a battery stack, it may be necessary to employ lateral support in conjunction with the stack during the welding process. As seen in FIG. 2, lateral support bars 88 may be placed adjacent to the battery stack when the stack reaches a predetermined height in excess of the dimension of support bar 88 indicated by the arrows.

When the desired number of battery components are welded to the stack, meaning that the desired number of electrochemical cells have been constructed, the insert is removed from the upper fixture, thereby increasing the depth thereof. An end block 18 is then secured to the upper fixture and friction welded to the adjacent terminal electrode. However, since the end block is essentially planar and the mating surface of the terminal electrode is also essentially planar, one or both of the components may include a peripheral weld rib pattern for bonding purposes.

In the alternate preferred embodiment, either the electrode or the separator frame includes all four flow channels and corresponding rib configurations, while the non-channelled component is planar on both sides. In this embodiment, a two-stage welding process is employed. In the first stage, an electrode and separator, one of which is planar, are welded together and the welded assembly, called a "prestack," is removed from the welder. The process is repeated to yield a sufficient number of prestacks to make a battery.

Prestack welding is similar to the above-described welding process except that the upper fixture insert is more complex. As discussed previously with reference to FIG. 5A, support is necessary behind every weld rib to prevent flexion and distortion of the battery component during welding. When a part has a weld rib pattern on one side and is planar on the opposite side, the part is self-supporting and planar tooling, as suggested in conjunction with the upper insert of the previously discussed preferred embodiment, is sufficient. However, when the component has a weld rib pattern on both sides, it is desirable for the tooling insert to provide the necessary support. The stepped configuration of tooling insert 80, shown in FIGS. 5A and 5B, is unique to the particular component to be welded to the extent that it is essentially a mirror image of the regions of differential depth. That is to say, tooling 80 is planar except for those regions in which it is stepped to support the opposite side of a weld (or kiss) rib.

Each prestack includes one face having a weld rib pattern and an opposite face which is planar. Thus, after the prestacks have been made, the welding process proceeds in accordance with the first preferred embodiment discussed above.

Referring again to FIG. 4, peripheral rib pattern 90 preferably includes a weld rib having a kiss rib disposed on both sides thereof, and a flash trap disposed between each kiss rib and the weld rib. This peripheral seal configuration is disposed on the weld rib pattern side of each electrode and separator in the preferred embodiment. This pattern appears on both sides of the component having the weld rib pattern in the alternate preferred embodiment. Thus, the peripheral weld rib pattern is consistent with the fact that one side of each component is planar in the first preferred embodiment. In the alternate preferred embodiment, however, wherein peripheral weld rib pattern 90 appears on both sides of the periphery of flow frame 60, tooling insert 80 should provide the appropriate stepped support corresponding to the mirror image of peripheral pattern 90.

It will be understood that while the various weld rib patterns are depicted in the drawings, they are not shown in the limiting sense and may comprise further variations as necessary to accommodate a particular flow or seal pattern. Further, the above description is of a preferred and an alternate exemplary embodiment of the present invention; the invention is not limited to the specific form shown. For example, while the tooling was described as providing support behind channels and channel backs, the tooling may be configured to provide support wherever distortion of the welded part may be necessary. Likewise, a partial channel could be incorporated into the alternate preferred embodiment rather than having a completely planar component mating with the weld rib pattern component. These and other modifications may be made without departing from the scope of the invention as expressed in the appended claims.

What is claimed:

1. A battery component for use in a flow battery containing fluid electrolyte, the battery component comprising:
   first and second bond ribs disposed on opposite sides of and defining a channel; and
   respective primary flash traps disposed adjacent said bond ribs opposite said channel.

2. A battery component for use in a flow battery containing fluid electrolyte, the battery component comprising:
   first and second kiss ribs defining a channel;
   respective primary flash traps disposed adjacent said first and said second kiss ribs opposite said channel; and
   first and second bond ribs disposed adjacent said primary flash traps.

3. A battery component for use in a flow battery containing fluid electrolyte, the battery component comprising:
   oppositely disposed first and second kiss ribs defining a channel;
   respective primary flash traps disposed adjacent said first and said second kiss ribs;
   respective first and second bond ribs disposed adjacent said primary flash traps opposite said first and said second kiss ribs;
   respective secondary flash traps disposed adjacent said first and second bond ribs opposite said primary flash traps; and
   respective residual kiss ribs disposed adjacent said secondary flash traps opposite said first and second bond ribs.

4. The battery component of claim 2, further comprising secondary flash traps disposed adjacent said first and second bond ribs.

5. A sealable flow path, comprising:
   a channel;
   first and second bond ribs disposed adjacent to and defining said channel;
   respective primary flash traps, disposed adjacent to said first and said second bond ribs;
   first and second kiss ribs disposed adjacent to said primary flash traps; and
   respective secondary flash traps disposed adjacent to said first and second kiss ribs.

6. A rib configuration, formed on the surface of a planar sheet, for defining a sealable region, comprising:
   a generally U-shaped conduit defined by a bottom member and a pair of oppositely disposed side members extending therefrom, said bottom member having an upper face disposed below said surface of said planar sheet and said side members extending above said surface of said planar sheet, said side members each having an inward facing wall defining said U-shaped conduit and an outward facing wall; and
   first and second bond ribs projecting upward from said surface of said planar sheet and having an inward facing bond rib wall and an outward facing bond rib wall, said bond ribs being spaced apart from said side members by respective flash traps, said flash traps each defined by said outward facing wall of said side members and said inward facing bond rib wall.

7. A battery component for use in a flow battery containing fluid electrolyte, the battery component comprising:
   a membrane;
   a frame disposed about the periphery of said membrane such that said membrane and said frame form a contiguous sheet; and
   seal means, disposed on a surface of said frame, for forming a flow path for the electrolyte.

8. The battery component of claim 7 wherein said seal means comprises:
   first and second kiss ribs defining a channel therebetween;
   respective primary flash traps disposed adjacent said first and said second kiss ribs; and
   first and second bond ribs disposed adjacent said primary flash traps.

9. The battery component of claim 8, wherein said seal means further comprises respective secondary flash traps disposed adjacent said first and said second bond ribs.

10. The battery component of claim 7 further comprising a peripheral weld rib disposed about the periphery of said frame.

11. The battery component of claim 7 wherein said membrane comprises separator material.

12. The battery component of claim 7 wherein said membrane comprises electrode material.

13. An electrochemical half cell for use in a flow battery, comprising:
    a first thin, flat, generally rectangular component comprising a first membrane surrounded by a first frame such that said first membrane and said first frame form a first contiguous sheet, said first frame having a first seal means, disposed on a first surface thereof, for forming a flow path and a second seal means, disposed on a second surface of said first frame, for forming a flow path; and
    a second thin, flat, generally rectangular component comprising a second membrane surrounded by a second frame such that said second membrane and said second frame form a second contiguous sheet having substantially the same peripheral dimensions as said first contiguous sheet, said second frame having a third seal means, disposed on a first surface thereof, for forming a flow path and a fourth seal means, disposed on a second surface of said second frame, for forming a flow path;
    wherein said first seal means and said third seal means form a flow path when placed in registration and said first surface said first component is sealed to said first surface of said second component.

14. The half cell of claim 13 wherein:
    said first and said fourth seal means comprise:
    first and second kiss ribs defining a channel therebetween;
    respective primary flash traps disposed adjacent said first and said second kiss ribs; and
    first and second bond ribs disposed adjacent said primary flash traps; and said second and said third seal means comprise
    a substantially flat surface having a partial channel disposed thereon.

15. The half cell of claim 13 wherein said first membrane comprises electrode material and said second membrane comprises separator material.

* * * * *

UNITED STATES PATENT AND TRADEMARK OFFICE
CERTIFICATE OF CORRECTION

PATENT NO. : 4,945,019

DATED : July 31, 1990

INVENTOR(S) : Gerald K. Bowen and Jeffrey P. Zagrodnik

It is certified that error appears in the above-identified patent and that said Letters Patent is hereby corrected as shown below:

Column 1, line 4, delete "FILED" and insert -- FIELD --

Signed and Sealed this

Fifteenth Day of October, 1991

Attest:

HARRY F. MANBECK, JR.

Attesting Officer

Commissioner of Patents and Trademarks